(12) United States Patent
Fuchikami

(10) Patent No.: US 10,240,915 B2
(45) Date of Patent: Mar. 26, 2019

(54) MEASUREMENT SYSTEM, MEASUREMENT METHOD, AND VISION CHIP

(71) Applicant: Panasonic Intellectual Property Corporation of America, Torrance, CA (US)

(72) Inventor: Ryuji Fuchikami, Fukuoka (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 597 days.

(21) Appl. No.: 14/850,181

(22) Filed: Sep. 10, 2015

(65) Prior Publication Data

US 2016/0054118 A1 Feb. 25, 2016

Related U.S. Application Data

(63) Continuation of application No. PCT/JP2015/000272, filed on Jan. 22, 2015.

(30) Foreign Application Priority Data

Mar. 6, 2014 (JP) .................................. 2014-043467
Nov. 27, 2014 (JP) .................................. 2014-240115

(51) Int. Cl.
*G01B 11/00* (2006.01)
*G01B 11/25* (2006.01)

(52) U.S. Cl.
CPC ...... *G01B 11/2509* (2013.01); *G01B 11/2513* (2013.01); *G01B 11/2536* (2013.01)

(58) Field of Classification Search
CPC ............ G01B 11/2509; G01B 11/2513; G01B 11/2536
See application file for complete search history.

(56) References Cited

U.S. PATENT DOCUMENTS

| | | | | | |
|---|---|---|---|---|---|
| 4,332,477 | A | * | 6/1982 | Sato | G01B 11/306 356/613 |
| 5,135,308 | A | * | 8/1992 | Kuchel | G01B 11/2531 250/237 G |
| 5,764,786 | A | * | 6/1998 | Kuwashima | G01B 11/00 348/E5.042 |
| 6,549,289 | B1 | * | 4/2003 | Ellis | A01K 11/006 348/135 |

(Continued)

FOREIGN PATENT DOCUMENTS

| | | |
|---|---|---|
| CN | 102472613 | 5/2012 |
| JP | 60-152903 | 8/1985 |

(Continued)

OTHER PUBLICATIONS

International Search Report of PCT application No. PCT/JP2015/000272 dated Apr. 28, 2015.

(Continued)

*Primary Examiner* — Shawn Decenzo
*Assistant Examiner* — Jarreas C Underwood
(74) *Attorney, Agent, or Firm* — Wenderoth, Lind & Ponack, L.L.P.

(57) ABSTRACT

A measurement system includes: a projection apparatus that projects, onto a subject, first pattern light indicating a first pattern projection image including a first pattern image corresponding to a specific bit in gray code obtained by gray-coding projection coordinates stipulated by a projection coordinate system, and a second pattern image having the same cycle as the first pattern image, but having a different phase from the first pattern image, following a projection sequence where projections of the first and second pattern images coexist; and at least one imaging apparatus that images the first pattern light and generates an imaged image.

15 Claims, 12 Drawing Sheets

(56) References Cited

U.S. PATENT DOCUMENTS

| | | | | |
|---|---|---|---|---|
| 7,140,544 | B2* | 11/2006 | Smith | G06K 7/10722 235/462.01 |
| 7,570,368 | B2* | 8/2009 | Belousov | G01B 11/24 356/601 |
| 7,583,391 | B2* | 9/2009 | Lu | G01B 11/25 356/601 |
| 9,151,600 | B2* | 10/2015 | Nakatsukasa | G01B 11/25 |
| 9,557,167 | B2* | 1/2017 | Kobayashi | G01B 11/2513 |
| 2007/0046924 | A1* | 3/2007 | Chang | G01C 7/00 356/3.01 |
| 2012/0089364 | A1* | 4/2012 | Takabayashi | G01B 11/25 702/167 |
| 2012/0133954 | A1 | 5/2012 | Takabayashi et al. | |
| 2012/0176478 | A1* | 7/2012 | Wang | G01B 11/2527 348/47 |
| 2012/0242795 | A1* | 9/2012 | Kane | G01B 11/2513 348/46 |
| 2013/0235387 | A1* | 9/2013 | Kim | G01B 11/24 356/601 |
| 2013/0278787 | A1* | 10/2013 | Shpunt | G01B 11/25 348/218.1 |
| 2013/0301096 | A1* | 11/2013 | Takahashi | G02B 26/105 359/204.3 |
| 2014/0071243 | A1* | 3/2014 | Nakatsukasa | G01B 11/25 348/46 |

FOREIGN PATENT DOCUMENTS

| | | |
|---|---|---|
| JP | 8-101023 | 4/1996 |
| JP | 9-021620 | 1/1997 |
| JP | 2003-270719 | 9/2003 |
| JP | 2006-177781 | 7/2006 |
| JP | 2008-141737 | 6/2008 |
| JP | 2008-145139 | 6/2008 |
| JP | 2014-014629 | 1/2014 |
| WO | 01/20539 | 3/2001 |

OTHER PUBLICATIONS

Joji Takei et al., "Development of a 3,000-fps 3D Imaging System Using a High-Speed Projector" Proceedings of the 2007 JSME Conference on Robotics and Mechatronics, May 10-12, 2007(English Abstract).

Idaku Ishii et al., "High Speed Target Tracking Algorithm for 1ms Visual Feedback System" JRSJ vol. 17 No. 2, pp. 195-201,1999. (English Abstract).

Joji Takei et al., "3,000-fps 3-D Shape Measurement Using a High-Speed Camera-Projector System" IEEE RSJ International Conference on Intelligent Robots and Systems, 2007.

The Extended European Search Report dated Mar. 14, 2017 for the related European Patent Application No. 15758032.5.

Jason Geng, "DLP-Based Structured Light 3D Imaging Technologies and Applications", Emerging Digital Micromirror Device Based Systems and Applications III, SPIE, 1000 20th St., Bellingham, WA, 98225-6705, USA, vol. 7932, No. 1, Feb. 10, 2011 (Feb. 10, 2011), pp. 1-15, XP060006632.

English Translation of Chinese Search Report dated Jun. 5, 2018 in Chinese Patent Application No. 201580000218.X.

* cited by examiner

FIG. 2A

|    | bit4 | bit3 | bit2 | bit1 | bit0 |
|----|------|------|------|------|------|
| 0  | 0 | 0 | 0 | 0 | 0 |
| 1  | 0 | 0 | 0 | 0 | 1 |
| 2  | 0 | 0 | 0 | 1 | 1 |
| 3  | 0 | 0 | 0 | 1 | 0 |
| 4  | 0 | 0 | 1 | 1 | 0 |
| 5  | 0 | 0 | 1 | 1 | 1 |
| 6  | 0 | 0 | 1 | 0 | 1 |
| 7  | 0 | 0 | 1 | 0 | 0 |
| 8  | 0 | 1 | 1 | 0 | 0 |
| 9  | 0 | 1 | 1 | 0 | 1 |
| 10 | 0 | 1 | 1 | 1 | 1 |
| 11 | 0 | 1 | 1 | 1 | 0 |
| 12 | 0 | 1 | 0 | 1 | 0 |
| 13 | 0 | 1 | 0 | 1 | 1 |
| 14 | 0 | 1 | 0 | 0 | 1 |
| 15 | 0 | 1 | 0 | 0 | 0 |
| 16 | 1 | 1 | 0 | 0 | 0 |
| 17 | 1 | 1 | 0 | 0 | 1 |
| 18 | 1 | 1 | 0 | 1 | 1 |
| 19 | 1 | 1 | 0 | 1 | 0 |
| 20 | 1 | 1 | 1 | 1 | 0 |
| 21 | 1 | 1 | 1 | 1 | 1 |
| 22 | 1 | 1 | 1 | 0 | 1 |
| 23 | 1 | 1 | 1 | 0 | 0 |
| 24 | 1 | 0 | 1 | 0 | 0 |
| 25 | 1 | 0 | 1 | 0 | 1 |
| 26 | 1 | 0 | 1 | 1 | 1 |
| 27 | 1 | 0 | 1 | 1 | 0 |
| 28 | 1 | 0 | 0 | 1 | 0 |
| 29 | 1 | 0 | 0 | 1 | 1 |
| 30 | 1 | 0 | 0 | 0 | 1 |
| 31 | 1 | 0 | 0 | 0 | 0 |

FIG. 2B

|    | bit3 | bit2 | bit1 | bit0 |
|----|------|------|------|------|
| 0  | 0 | 0 | 0 | 0 |
| 1  | 0 | 0 | 0 | 0 |
| 2  | 0 | 0 | 0 | 1 |
| 3  | 0 | 0 | 0 | 1 |
| 4  | 0 | 0 | 1 | 0 |
| 5  | 0 | 0 | 1 | 0 |
| 6  | 0 | 0 | 1 | 1 |
| 7  | 0 | 0 | 1 | 1 |
| 8  | 0 | 1 | 0 | 0 |
| 9  | 0 | 1 | 0 | 0 |
| 10 | 0 | 1 | 0 | 1 |
| 11 | 0 | 1 | 0 | 1 |
| 12 | 0 | 1 | 1 | 0 |
| 13 | 0 | 1 | 1 | 0 |
| 14 | 0 | 1 | 1 | 1 |
| 15 | 0 | 1 | 1 | 1 |
| 16 | 1 | 0 | 0 | 0 |
| 17 | 1 | 0 | 0 | 0 |
| 18 | 1 | 0 | 0 | 1 |
| 19 | 1 | 0 | 0 | 1 |
| 20 | 1 | 0 | 1 | 0 |
| 21 | 1 | 0 | 1 | 0 |
| 22 | 1 | 0 | 1 | 1 |
| 23 | 1 | 0 | 1 | 1 |
| 24 | 1 | 1 | 0 | 0 |
| 25 | 1 | 1 | 0 | 0 |
| 26 | 1 | 1 | 0 | 1 |
| 27 | 1 | 1 | 0 | 1 |
| 28 | 1 | 1 | 1 | 0 |
| 29 | 1 | 1 | 1 | 0 |
| 30 | 1 | 1 | 1 | 1 |
| 31 | 1 | 1 | 1 | 1 |

FIG. 7

| | PIXEL 0 | PIXEL 1 | PIXEL 2 | PIXEL 3 | PIXEL 4 | PIXEL 5 | PIXEL 6 | PIXEL 7 | PIXEL 8 | PIXEL 9 | PIXEL 10 | PIXEL 11 | PIXEL 12 | PIXEL 13 | PIXEL 14 | PIXEL 15 |
|---|---|---|---|---|---|---|---|---|---|---|---|---|---|---|---|---|
| FIRST IMAGE FRAME | 0 | 1 | 1 | 0 | 0 | 1 | 1 | 0 | 0 | 1 | 1 | 0 | 0 | 1 | 1 | 0 |
| SECOND IMAGE FRAME | 0 | 0 | 1 | 1 | 0 | 0 | 1 | 1 | 0 | 0 | 1 | 1 | 0 | 0 | 1 | 1 |
| THIRD IMAGE FRAME | 1 | X | 0 | X | 1 | X | 0 | X | 1 | X | 0 | X | 1 | X | 0 | X |

MEASUREMENT SYSTEM, MEASUREMENT METHOD, AND VISION CHIP

BACKGROUND

1. Technical Field

The present disclosure relates to a measurement system, a measurement method used in the measurement system, and a vision chip.

2. Description of the Related Art

A method of acquiring a three-dimensional (3D) shape of an object by a structured light has long been known. For example, Japanese Unexamined Patent Application Publication No. 60-152903 discloses such a technology.

SUMMARY

One non-limiting and exemplary embodiment provides improved tracking capabilities of the motion of objects, and further improved robustness.

In one general aspect, the techniques disclosed here feature a measurement system, including: a projection apparatus that projects, onto a subject, first pattern light indicating a first pattern projection image including a first pattern image corresponding to a specific bit in gray code obtained by gray-coding projection coordinates stipulated by a projection coordinate system, and a second pattern image having the same cycle as the first pattern image, but having a different phase from the first pattern image, following a projection sequence where projections of the first and second pattern images coexist; and at least one imaging apparatus that images the first pattern light and generates an imaged image.

These comprehensive or specific embodiments may be implemented as a system, a method, an integrated circuit, a computer program, or a computer-readable storage medium, or any combination of a device, system, method, integrated circuit, computer program, and computer-readable storage medium. Examples of a computer-readable storage medium may include non-volatile recording media, such as a Compact Disc-Read Only Memory (CD-ROM) and so forth.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 2A is a diagram illustrating a 5-bit gray code table;

FIG. 2B is a diagram illustrating a 5-bit auxiliary code corresponding to 5-bit gray code;

FIG. 7 is a diagram illustrating the way which a projection frame appears when having acquired 0-bit data for X-coordinates;

DETAILED DESCRIPTION

Figure 10:
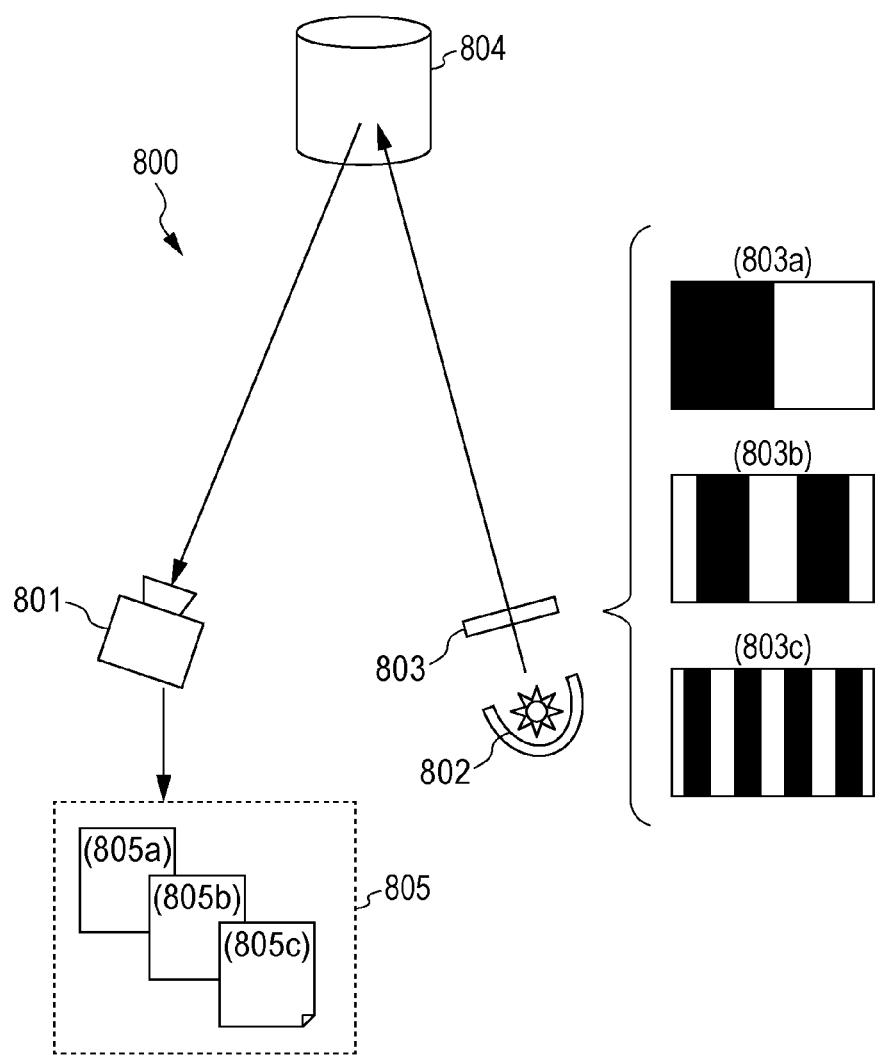
FIG. 10 is a schematic diagram illustrating a schematic configuration example of a conventional measurement system.

Before describing embodiments of the present disclosure, a conventional measurement system 800 disclosed in Japanese Unexamined Patent Application Publication No. 60-152903 will first be described with reference to FIG. 10. The measurement system 800 includes an imaging apparatus 801, a light source 802, and a slit board 803. The slit board 803 has slits with different patterns based on various gray codes, such as patterns 803a, 803b, and 803c, which exhibit gray codes. The imaging apparatus 801 images light corresponding to the patterns 803a, 803b, and 803c, and generates images 805a, 805b, and 805c. The images 805a, 805b, and 805c make up an image group 805.

According to this configuration, which direction the light from the light source 802 has been emitted in via the slit board 803 the same light/dark patterns of the three images included in the image group 805 are based on can be uniquely identified by decoding the gray code. Accordingly, disparity occurring according to the distance to a subject 804 can be identified, and the three-dimensional shape of the subject 804 can be analogized by triangulation.

Also, besides Japanese Unexamined Patent Application Publication No. 60-152903, in the field of measurement there is known a high-speed 3D shape measurement technique using light pattern projection disclosed in Takei Joji, Kagami Shingo, Hashimoto Koichi: "Development of a 3,000-fps 3D Imaging Measurement System Using A High-Speed Projector", The Robotics and Mechatronics Conference Proceedings 2007, "1P1-M02(1)"-"1P1-M02(4)", 2007-05-11 (hereinafter, "Takei et al").

Takei et al disclose a technique for high-speed 3D shape measurement technique using light pattern projection. The measurement system in Takei et al has an imaging apparatus, a light source, and a projection apparatus including a lens and digital micro-mirror device. The imaging apparatus has a function of performing high-speed photography. For example, the imaging apparatus can perform high-speed photography at 6000 fps. The projection apparatus can project binary patterns having 1024×768 pixels at 6000 fps or more. It can be said that a feature thereof in comparison with Japanese Unexamined Patent Application Publication No. 60-152903 is the point that the light source and slit board have been replaced with the projection apparatus having the digital micro-mirror device which can be controlled from a calculator at an extremely fast rate.

For example, a pattern obtained by performing Manchester coding of bits obtained by gray-coding X-coordinates of a 1024×768 image is set in the digital micro-mirror device at 6000 fps. The pattern is projected on a projection object, and the imaging apparatus shoots the projection object upon which the pattern has been projected at 6000 fps.

The X-coordinate is in a range of 0 to 1023, and accordingly each coordinate is expressed in terms of 10 bits. Further, by performing Manchester coding, each coordinate is expressed in terms of 20 bits. Accordingly, the X coordinates are obtained from 20 frames of imaged images. The distance to the projection object can be obtained for each pixel by triangulation. The results of imaging are transmitted to a calculating apparatus (e.g., a personal computer) and analyzed. New X-coordinate bits can be obtained for recalculation every two frames, by Manchester coding. Accordingly, 3D measurement at resolution of 3000 fps can be realized as the final throughput.

There is also known the image processing technology regarding high-speed vision space disclosed in Ishii Idaku, Ishikawa Masatoshi: "High Speed Target Tracking Algorithm for 1 ms Visual Feedback System", Journal of the Robotics Society of Japan, vol. 17, No. 2, pp. 195-201 (1999) (hereinafter, "Ishii et al"). According to Ishii et al, a high-speed vision space can be defined where the amount of motion of an object between frames is restricted to within 1 pixel within an imaging pixel space, by performing imaging with regard to the system dynamics of an imaging space at a sufficiently fast frame rate, and such an image processing algorithm is created.

Problems of the conventional art that has been considered here will be described. Takei et al suggest the possibility of realizing three-dimensional measurement of a moving object at a high frame rate, using a projection apparatus and an imaging apparatus. However, according to the method of Takei et al, in a case where the projected image of the projection apparatus has 1024 pixels in the X-coordinate direction, for example, 20 frames are used to transmit 10 bits work of X-coordinates. It is true that new three-dimensional measurement results are updated each time a new bit is finalized, so three-dimensional measurement can be performed at a rate of 3000 fps. However, these results include the results before the 20 frames by imaging at the rate of 6000 fps, so the actual time resolution is around 300 fps, which is 1/20 the projection rate. Consequently, the moment speed of a subject which can actually be measured is markedly restricted.

In light of such problems, a measurement system having a new structure, a measurement method and vision chip used therein have been conceived. According to the present disclosure, the frame rates of the projection apparatus and imaging apparatus are restricted to be sufficient for the movement speed of a subject to be measured. Thus, a new pattern coding system is provided with improved tracking capabilities of the motion of objects, and further improved robustness. For example, in a case of measuring a human body, even in a case of assuming a subject that is performing an exercise such as in sports or the like, movement exceeding a speed of 30 meters per second is extremely unlikely. If the object of measuring the human body is for medical purposes, the subject speed can be restricted to even lower speeds.

Also, interactive projection such as projection mapping of amusement facilities and the like is conceivable. Here, in a case of projecting contents synchronized with a ball in a bowling alley, for example, the world record for a ball speed is around 15 meters per second at best. This means that the system will function correctly even if the range of subject speed is restricted according to the usage.

An overview of an aspect of the present disclosure is as follows. A measurement system according to an aspect of the present disclosure includes: a projection apparatus that projects, onto a subject, first pattern light indicating a first pattern projection image including a first pattern image corresponding to a specific bit in gray code obtained by gray-coding projection coordinates stipulated by a projection coordinate system, and a second pattern image having the same cycle as the first pattern image, but having a different phase from the first pattern image, following a projection sequence where projections of the first and second pattern images coexist; and at least one imaging apparatus that images the first pattern light and generates an imaged image. According to this configuration, a measurement system can be provided which can improve tracking capabilities of the motion of objects and improve robustness.

The measurement system may further include a computing device that measures three-dimensional shape information of the subject based on the imaged image. According to this configuration, three-dimensional shape information of the subject can be measured in real-time.

The projection apparatus may project, upon the subject, second pattern light indicating a second pattern projection image including the first pattern image but not including the second pattern image, for one frame period or more, and thereafter projects the first pattern light on the subject for two frame periods or more. The computing device may measure second three-dimensional shape information indicating absolute distance to the subject, based on the imaged image of the second pattern light projected on the subject that has been imaged by the imaging apparatus, measure first three-dimensional shape information indicating relative amount of change of the subject based on the imaged image of the first pattern light projected on the subject that has been imaged by the imaging apparatus, and update the second three-dimensional shape information based on the first three-dimensional shape information. According to this configuration, higher time resolution as compared to conventional techniques can be obtained.

The first pattern projection image may further include a third pattern image that differs from the first and second pattern images, and the projection sequence further include projection of the third pattern image. When giving attention to a certain pixel identified by the projection coordinates corresponding among the first, second and third pattern images, the pixel value of the pixel within the third pattern image may be 0 when the pixel value of the pixel is 1 within both the first and second pattern images, and the pixel value of the pixel within the third pattern image may be 1 when the pixel value of the pixel is 0 within both the first and second pattern images. According to this configuration, places where pattern light is not being cast can be detected based on the imaging results.

In a case where the pixel value of the pixel differs between the first and second pattern images, the pixel value of the pixel within the third pattern image may be a value of 0 or 1 less frequently occurring in past frames of the third pattern image. According to this configuration, applicability to two-dimensional image processing can be increased.

The computing device may selectively switch mixing of projection of the second pattern image in the projection sequence, in accordance with three-dimensional amount of change of the subject. According to this configuration, the speed of the measurement system can be restricted. In the same way, restriction can be applied to acceleration of the moving object as well.

The computing device may selectively decide the specific bit in gray code in accordance with three-dimensional amount of change of the subject. According to this configuration, the range over which the amount of change of the subject can be tracked can be dynamically changed.

The computing device, independently from measurement of the three-dimensional shape of the subject, may search for amount of two-dimensional movement, and decode an image indicating the gray code imaged by the at least one imaging apparatus, referencing the two-dimensional amount of movement. According to this configuration, precise three-dimensional measurement can be performed taking into consideration two-dimensional amount of movement.

The image used for searching for the two-dimensional amount of movement may be obtained by compositing a plurality of images acquired by the three-dimensional shape measurement. According to this configuration, the composited image can be used for two-dimensional image processing such as motion searching, without new photography being performed.

The computing device may decode the imaged image, and convert the three-dimensional shape information obtained from the imaging coordinate system into three-dimensional shape information in the projection coordinate system, from the correlation between the decoded projection coordinates and the imaging pixel coordinates stipulated by the imaging coordinate system of the at least one imaging apparatus. According to this configuration, three-dimensional shape information in the projection coordinate system can be obtained.

The at least one imaging apparatus may be a plurality of imaging apparatuses, the plurality of imaging apparatuses imaging the first pattern light complementing the imaging range of the subject of each other. According to this configuration, occlusion regions where pattern light is cast but imaging cannot be performed, can be reduced.

The computing device may decode the imaged image, and generate a moiré topography image from the correlation between the decoded projection coordinates and the imaging pixel coordinates stipulated by the imaging coordinate system of the at least one imaging apparatus. According to this configuration, a moiré topography image can be obtained as a moving image, and the present disclosure can be suitably applied to the field of medicine.

The computing device may generate a projection image based on the three-dimensional shape information, the projection apparatus projecting projection light indicating the projection image on the subject. According to this configuration, the present measurement system can be made to function as a projection system.

A vision chip according to an aspect of the disclosure, used in the above measurement system, includes a plurality of unit pixels. Each of the plurality of unit pixels includes a photoreceptor that receives light and generates charge, a first and second charge accumulator that respectively accumulate a first and second charge obtained by the photoreceptor at different points-in-time, and a comparator that compares an amount of the first charge accumulated in the first charge accumulator with an amount of the second charge accumulated in the second charge accumulator, and generates a first bit indicating the relation in magnitude between the first and second amounts of charge, and a second bit indicating whether or not the difference between the first and second amounts of charge is within a predetermined range, based on the comparison results. According to this configuration, there is no need to provide external memory, and memory capacity and band cost can be minimized.

A measurement method according to an aspect of the present disclosure, used in a measurement system including a projection apparatus and an imaging apparatus, includes: projecting, using the projecting apparatus, onto a subject to be measured, second pattern light indicating a first pattern projection image including a first pattern image corresponding to a specific bit in gray code obtained by gray-coding projection coordinates stipulated by a projection coordinate system, and not including a second pattern projection image having the same cycle as the first pattern image, but having a different phase from the first pattern image, for one frame period or more, and thereafter projecting first pattern light indicating a first pattern projection image including the first and second pattern images on the subject for two frame periods or more; measuring second three-dimensional shape information indicating absolute distance to the subject, based on the imaged image of the second pattern light projected on the subject that has been imaged by the imaging apparatus; measuring first three-dimensional shape information indicating relative amount of change of the subject based on the imaged image of the first pattern light projected on the subject that has been imaged by the imaging apparatus; and updating the second three-dimensional shape information based on the first three-dimensional shape information. According to this measurement method, tracking capabilities of the motion of objects and robustness can be improved.

According to the present disclosure, when performing three-dimensional measurement of a moving object using the projection apparatus and imaging apparatus, three-dimensional measurement results can be obtained with higher time resolution as to the frame rate of the projection apparatus, as compared to conventional arrangements.

A measurement method according to an aspect of the present disclosure includes: repeating a projection of first data indicating data of a specific bit of a gray code obtained by gray-coding a projection coordination in a projection coordinate system to an object at a first cycle in a first projection; repeating a projection of second data to the object at the first cycle in a second projection; and imaging the projected first data on the object and the projected second data on the object, wherein a second adoption after a first adoption is repeated in the first projection, wherein a first image is adopted as the first data a first consecutive number of times in the first adoption, wherein a second image is adopted as the first data the first consecutive number of times in the second adoption, wherein a fourth adoption after a third adoption is repeated in the second projection, wherein a third image is adopted as the second data the first consecutive number of times in the third adoption, and wherein a fourth image is adopted as the second data the first consecutive number of times in the fourth adoption.

Specific embodiments of the present disclosure will be described below with reference to the drawings. Components which are the same or similar in the following description are denoted by the same reference numerals. Redundant description may be omitted. It should be noted that the projection system according to an embodiment of the present disclosure is not restricted to the following exemplary illustrations.

First Embodiment

Figure 1:
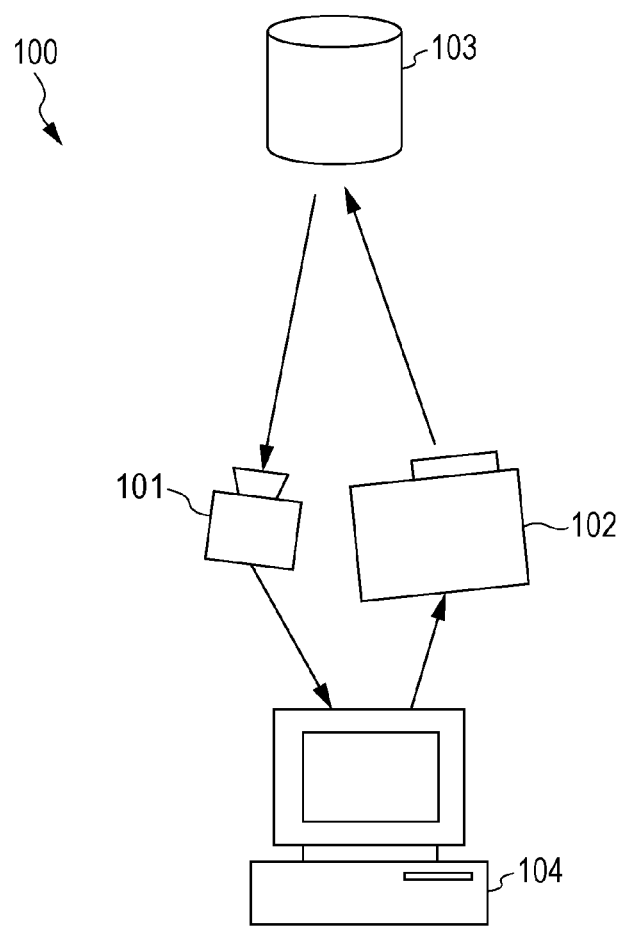
FIG. 1 is a schematic diagram illustrating a schematic configuration example of a measurement system according to a first exemplary embodiment.

The structure, functions, and operations of a measurement system 100 according to a first embodiment of the present disclosure will be described with reference to FIGS. 1 through 6. FIG. 1 schematically illustrates an example of a schematic configuration of the measurement system 100. The measurement system 100 includes an imaging apparatus 101, a projection apparatus 102, and a calculator 104.

The projection apparatus 102 projects, on a subject, a first pattern light indicating a first pattern projection image including a first pattern image and a second pattern image, in accordance with a projection sequence where projection of first and second pattern images coexist. The first pattern image is an image corresponding to a particular bit in gray code, obtained by gray-coding projection coordinates stipulated by a projection coordinate system. The second pattern image is an image having the same cycle as the first pattern image, but having a different phase from the first pattern image. In the Present Specification, the term projection coordinate system means a coordinate system that identifies the coordinates of the pixels in the pattern images for projection. Also, coordinates which identify the pixels of the pattern images are called "projection coordinates" of the projection coordinate system. The projection apparatus 102 includes a light source, lens optical system, and so forth.

The projection apparatus 102 has resolution of 32 pixels in the X-axis direction and 28 pixels in the Y-axis direction. Note however, that this resolution is a specification to simplify description. There are known digital light processing (DLP) projectors and so forth, for example. a DLP projector may have resolution of 1920 pixels in the X-axis direction and 1080 pixels in the Y-axis direction. Binary patterns exceeding 20000 fps can be output using such a DLP projector. A wide range of such products of this type can be used for the projection apparatus 102.

Figure 3:
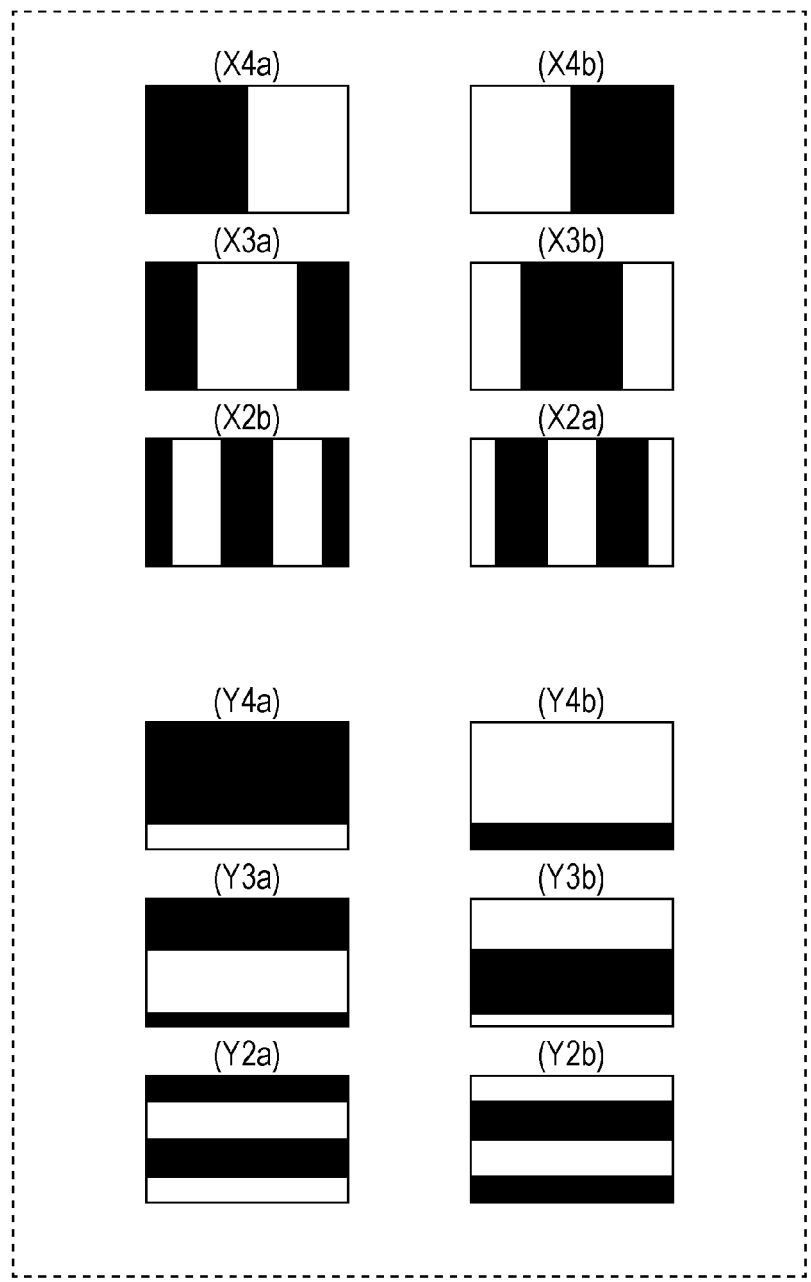
FIG. 3 is a conceptual diagram illustrating a part of pattern images corresponding to 5-bit gray code.

FIG. 2A illustrates a 5-bit gray code obtained by gray-coding the values of 0 through 31 for the X-coordinates. FIG. 2B illustrates a 5-bit auxiliary code corresponding to 5-bit gray code. FIG. 3 illustrates a part of pattern images corresponding to 5-bit gray code. The gray code illustrated in FIG. 2A is obtained by coding 32 types of values by the 5 bits of bit 0 through bit 4. Due to the nature of gray code, only one bit changes between adjacent values.

In FIG. 3, (X4a) indicates a pattern image corresponding to bit 4 of the X-coordinates gray code value, and (X4b) indicates a pattern image obtained by inverting (X4a). In the same way, (X3a) indicates a pattern image corresponding to bit 3 of the X-coordinates gray code value, and (X3b) indicates a pattern image obtained by inverting (X3a). (X2a) indicates a pattern image corresponding to bit 2 of the X-coordinates gray code value, and (X2b) indicates a pattern image obtained by inverting (X2a).

In FIG. 3, (Y4a) indicates a pattern image corresponding to bit 4 of the Y-coordinates gray code value, and (Y4b) indicates a pattern image obtained by inverting (Y4a). In the same way, (Y3a) indicates a pattern image corresponding to bit 3 of the Y-coordinates gray code value, and (Y3b) indicates a pattern image obtained by inverting (Y3a). (Y2a) indicates a pattern image corresponding to bit 2 of the Y-coordinates gray code value, and (Y2b) indicates a pattern image obtained by inverting (Y2a). Although not illustrated, corresponding pattern images and inverted pattern images may exist for bit 1 and 0 of the X-coordinates and Y-coordinates as well.

The projection apparatus 102 sequentially projects these patterns on a subject 103. The projection apparatus 102 projects projection light, including projection of images according to the gray code and auxiliary code, following a later-described projection sequence. The imaging apparatus 101 sequentially images the projected pattern light, and generates an imaged image. The imaging apparatus 101 includes an imaging coordinate system which stipulates imaging pixel coordinates. The imaging apparatus 101 includes an imaging sensor, lens optical system, and so forth. In the Present Specification, the term imaging coordinate system means a coordinate system that identifies the coordinates of the pixels in the imaged images acquired by the imaging apparatus 101. The coordinates of the pixels of the imaged images are called "imaging coordinates" to distinguish from "projection coordinates" of the imaging coordinate system.

The calculator 104 has functions of controlling the entire measurement system 100. For example, the calculator 104 performs measurement of three-dimensional shape information of the subject, based on imaged images. The calculator 104 may be realized by a computer, an operation device such as a processor, or a semiconductor integrated circuit, for example. Examples of semiconductor integrated circuits include application specific integrated circuit (ASIC) and field programmable gate array (FPGA), for example. A computer program which exhibits the functions of the components may be loaded in the memory, with the functions of the components being realized by a processor within the semiconductor integrated circuit successively executing the computer program.

Figure 4:
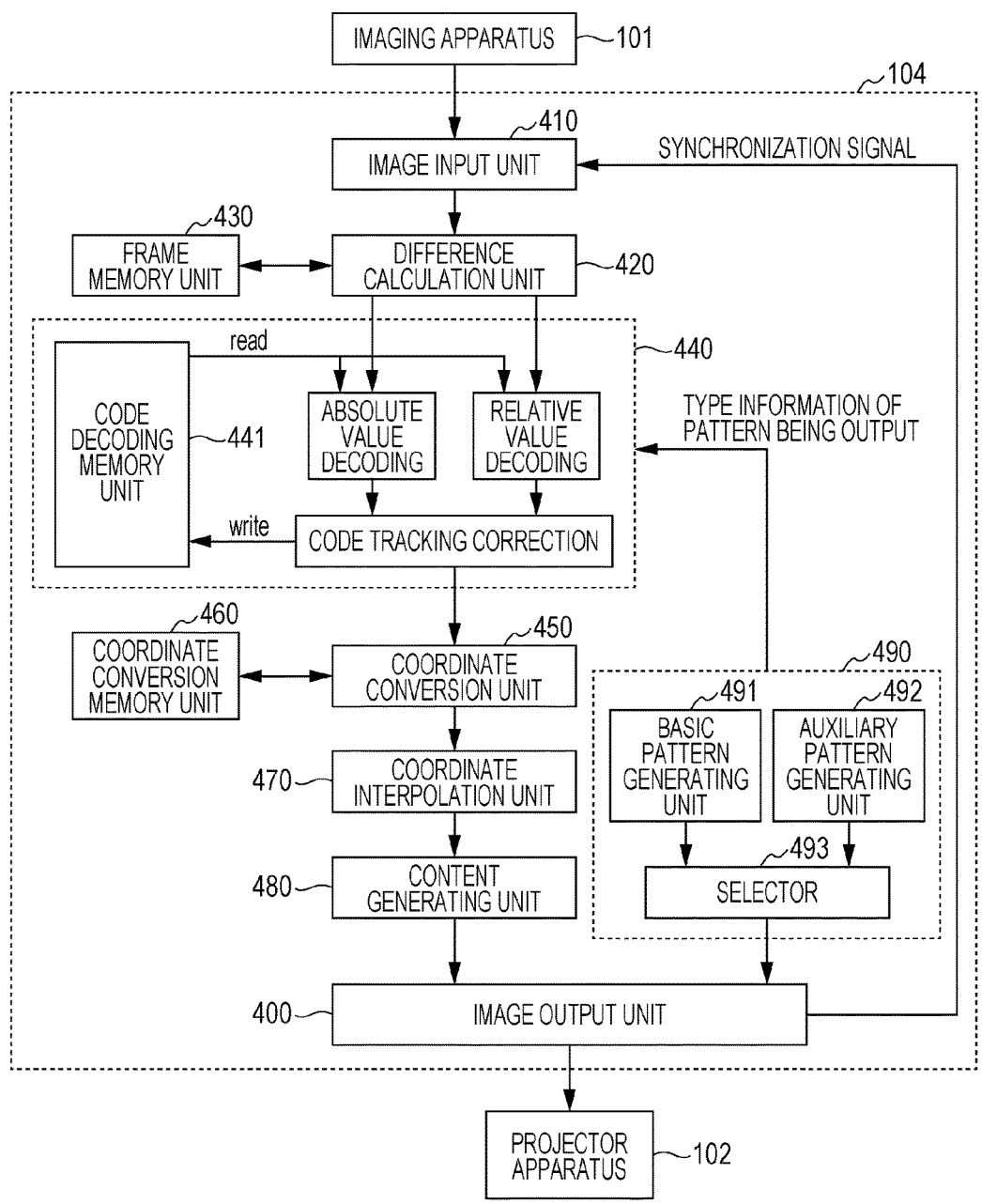
FIG. 4 is a schematic functional block diagram of a calculator according to the first exemplary embodiment.

Details of the structure and functions of the calculator 104 will be described with reference to FIG. 4. FIG. 4 illustrates an example of a functional block configuration of the calculator 104. The calculator 104 includes an image output unit 400, an image input unit 410, a difference calculation unit 420, a frame memory unit 430, a code decoding unit 440, a coordinate conversion unit 450, a coordinate conversion memory unit 460, a coordinate interpolation unit 470, content generating unit 480, and a pattern generating unit 490. The memory units in the calculator 104 may be configured including random access memory (RAM) or the like, for example. Note that the coordinate conversion unit 450, coordinate conversion memory unit 460, coordinate interpolation unit 470, and content generating unit 480 may be optionally provided. The measurement system 100 may function as a projection system, which will be described later. The functions which these functional blocks have can be implemented in the calculator 104 when functioning as a projection system.

The image input unit 410 receives imaged images (image data) imaged by the imaging apparatus 101, synchronously with the image output unit 400. The image input unit 410 transmits the received image data to the difference calculation unit 420. The difference calculation unit 420 calculates the difference in pattern images representing inverted bits and non-inverted bits for each bit of the gray code, thereby decoding the Manchester code, and outputs data to the code decoding unit 440 every two frames. Specifically, if the imaged data received from the image input unit 410 is an X and Y coordinate non-bit-inverted image, the difference calculation unit 420 writes the image data to the frame memory unit 430. If the imaged data is an X and Y coordinate bit-inverted image, the difference calculation unit 420 reads to the non-bit-inverted image written to the frame memory unit 430 before, and finds the difference between the two. By finding the difference, the "0"s and "1"s of the projection light can be distinguished without dependency on the color of the subject or the ambient light. A region where the difference is a predetermined value or lower is determined as being a region where no projection light has been projected, and that region can be eliminated from being a region which is the object of measurement.

A code decoding memory unit 441 is provided with a write region for each pixel of the imaging apparatus 101. The bit values of the coordinate data that has been gray coded is written to that write region in increments of bits. This operation is sequentially executed during the exposure time of the imaging apparatus 101.

The code decoding unit 440 reads out the data recorded in the code decoding memory unit 441 in increments of bits. The code decoding unit 440 updates a specific bit in accordance with information indicating the type of pattern currently being output by the pattern generating unit 490 (pattern type information), and writes the updated data in increments of bits to the aforementioned write region within the code decoding memory unit 441.

Upon having received imaging data based on the second pattern light indicating the second pattern projection image, the code decoding unit 440 decodes the imaging data and generates second three-dimensional shape information representing the relative distance information to the subject. Upon having received imaging data based on the first pattern light indicating the first pattern projection image, the code decoding unit 440 decodes that image data, and generates first three-dimensional shape information representing relative amount of change of the subject. At this time, the code decoding unit 440 corrects (updates) the absolute distance information to the subject based on the amount of change. That is to say, the code decoding unit 440 updates the second three-dimensional shape information based on the first three-dimensional shape information.

The code decoding unit 440 finally reconverts the gray code coordinate data recorded in the code decoding memory unit 441 into binary, and outputs to the coordinate conversion unit 450. Due to the processing so far, it can be found which pixel of the projection apparatus 102 that projection light, imaged at a certain pixel of the imaging apparatus 101, has been projected from. That is to say, the correlation between projection coordinates and imaging coordinates can be known. Accordingly, once the relative positional relationship between the imaging apparatus 101 and the projection apparatus 102 is known, the distance to the subject can be found by triangulation for each imaged pixel. However, the obtained information is distance information corresponding to the imaging pixels of the imaging apparatus 101 accordingly, that information is converted into distance information corresponding to the pixel coordinates of the projection apparatus 102 in the present embodiment.

The coordinate conversion unit 450 writes the data received from the code decoding unit 440 into a region of the coordinate conversion memory unit 460 identified by an address corresponding to the projection coordinates of the projection apparatus 102. Thereafter, the coordinate conversion unit 450 reads out the second three-dimensional shape information from the coordinate conversion memory unit 460, in order of X-coordinates and Y-coordinates of the projection apparatus 102, thereby generating distance information to the subject corresponding to the projection coordinates of the projection apparatus 102.

At that time, there may be a projection pixel generated which does not have a corresponding point. Specifically, of the pattern images projected on the subject, each light corresponding to a certain plurality of pixels can be imaged by one imaging pixel of the imaging apparatus 101. In this case, the projection pixels with no corresponding points are included on the pixel coordinates of one of the two adjacent projection pixels, due to the nature of gray code, so one projection pixel is in a state of having no correlating destination.

The coordinate interpolation unit 470 receives distance information corresponding to the projection coordinates of the projection apparatus 102, from the coordinate conversion unit 450. The coordinate interpolation unit 470 interpolates distance information regarding projection coordinates having no distance information. This is limited to portions where there are a certain number of projection coordinates having distance information which can be interpolated present in the perimeter thereof, and is performed using an interpolation technique such as linear interpolation or the like, from the distance information of the peripheral coordinates. The coordinate interpolation unit 470 outputs the distance information from the projection coordinate system to the content generating unit 480.

The content generating unit 480 generates video content for projection. The content generating unit 480 processes video content recording beforehand based on the distance information received from the coordinate interpolation unit 470, and outputs the processed video content to the image output unit 400. The processed video content may be referred to as "post-processing video content", to distinguish from the video content before processing that has been recorded beforehand.

The content generating unit 480 generates video content accurately corresponding to the distance to the subject, without any coordinate deviation. The content generating unit 480 outputs the post-processing video content for projection to the image output unit 400.

The pattern generating unit 490 has a basic pattern generating unit 491, an auxiliary pattern generating unit 492, and a selector 493. The basic pattern generating unit 491 generates a basic pattern indicating gray code obtained by gray-coding the projection coordinates stipulated by the projection coordinate system. The first image pattern is included in the basic pattern. The auxiliary pattern generating unit 492 generates an auxiliary pattern having the same cycle as the basic pattern, but having a different phase from the basic pattern. The second image pattern is included in the auxiliary pattern.

A basic pattern or auxiliary pattern is selected by the selector 493, and output to the image output unit 400. The auxiliary pattern and basic pattern are selectively intermingled by switching of the selector 493 in accordance with the three-dimensional amount of change of the subject 103. As a result, a projection sequence where projection of basic patterns and auxiliary patterns coexist is decided.

The image output unit 400 outputs video content generated by the content generating unit 480, and projection patterns including basic patterns and auxiliary patterns, generated by the pattern generating unit 490, to the projection apparatus 102. The projection apparatus 102 projects projection light indicating the post-processing video content on the subject 103.

Figure 5:
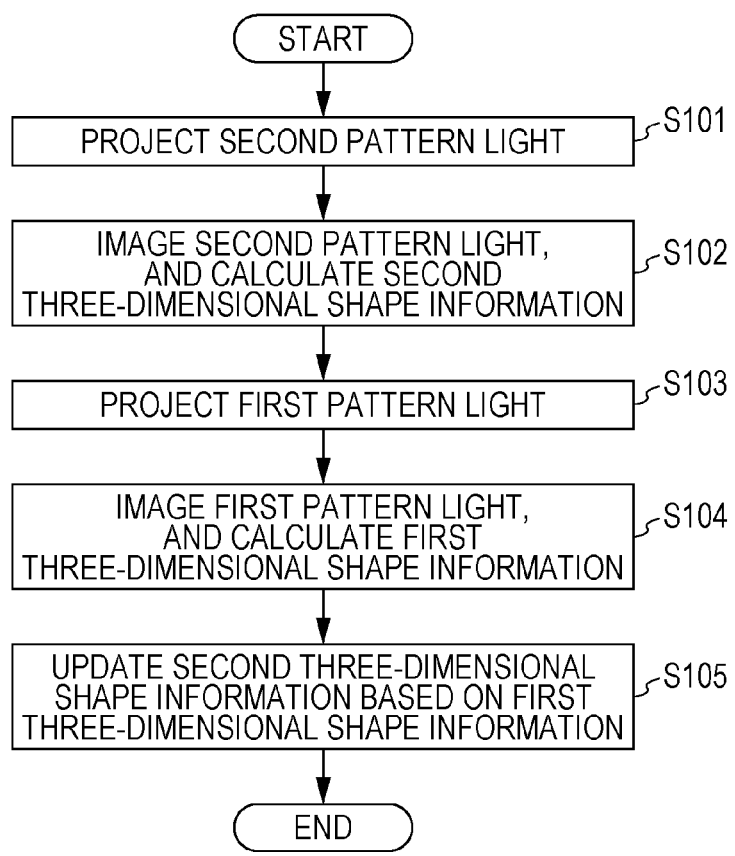
FIG. 5 is a flowchart illustrating a measurement method of the measurement system according to the first exemplary embodiment.
Figure 6A:
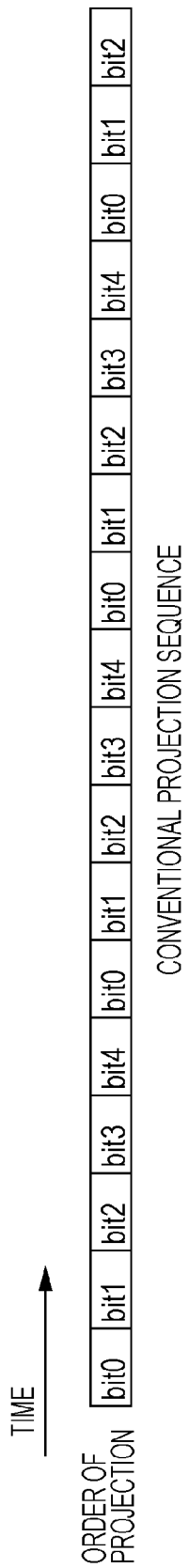
FIG. 6A is a diagram illustrating a projection sequence in conventional three-dimensional measurement.
Figure 6B:
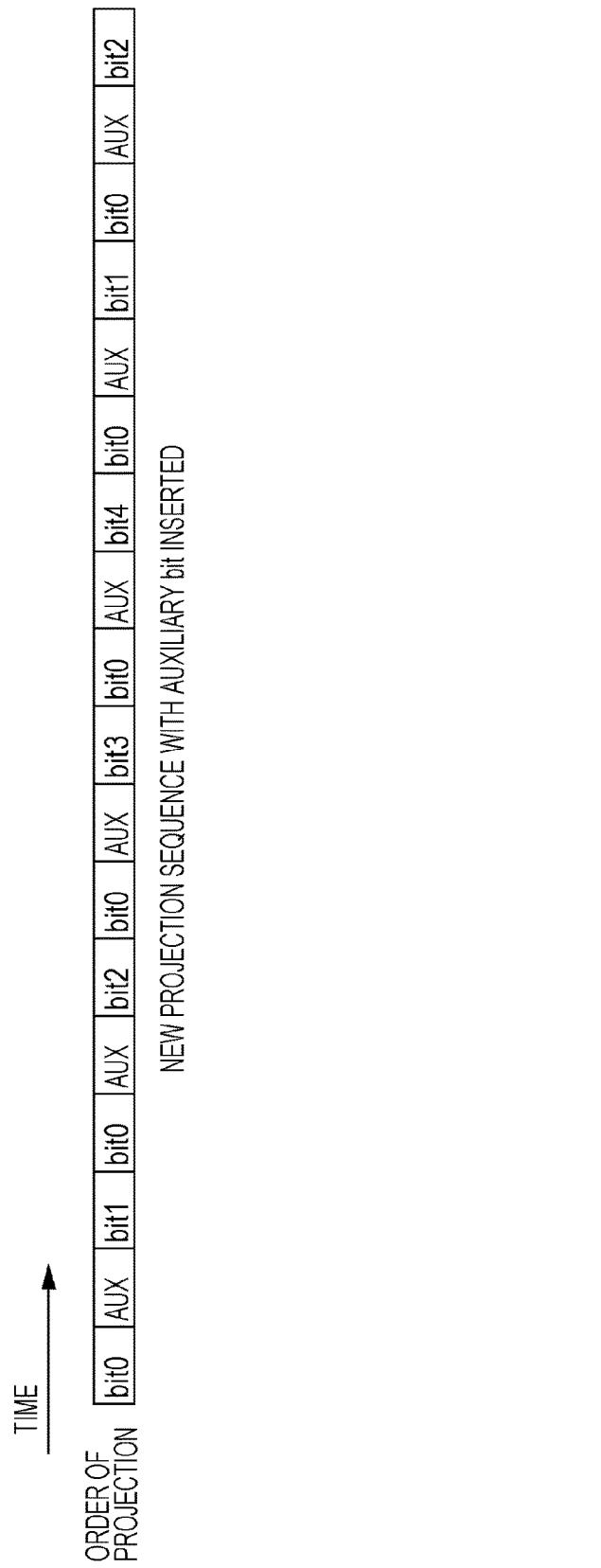
FIG. 6B is a diagram illustrating a projection sequence according to the first exemplary embodiment.

Operations of the measurement system 100 will be describe with reference to FIGS. 5 through 6B. FIG. 5 is a flowchart of the measurement method of the measurement system 100.

Steps S101 and S102

First, an example of an initial calibration method of the measurement system 100 will be described. In the initial calibration, the projection apparatus 102 projects second pattern light, indicating a second pattern projection image that includes a first pattern image does not include a second pattern image, on the subject for a period of 1 frame or longer. In the initial calibration, a non-moving object or the like that has a reference plane is set at the position of the subject 103. The projection apparatus 102 projects pattern light indicating the pattern image (X4a) in FIG. 3 on the subject 103. The imaging apparatus 101 then images this pattern light, and acquires a first calibration image.

Next, the projection apparatus 102 projects pattern light indicating the pattern image (X4b) in FIG. 3 on the object. The imaging apparatus 101 then images this pattern light, and acquires a second calibration image. By comparing the first calibration image and the second calibration image, a region where difference is small can be determined to be a region where no projection light has been cast. On the other hand, a region where difference is great can be determined to be a region where projection light has been cast, and projection coordinates can be decoded from the code of this difference.

By repeating the above-described processing on all 5 bits of each of the X coordinate and Y coordinate, it can be known from which pixel of the projection apparatus 102 that the projection light, imaged at a certain pixel of the imaging apparatus 101, has been projected. That is to say, the correlation between the projection coordinates and the imaging coordinates stipulated by the imaging coordinates system of the imaging apparatus can be known. Finally, absolute distance information to the reference plane (second three-dimensional shape information) is obtained by the calculator 104.

In later-described 3D measurement, the difference in the X axial direction as to the reference plane is converted into distance by triangulation. Y-axis directional setup error, lens distortion, and so forth, may be obtained beforehand in the initial calibration. Of course, in a case where measurement precision is not necessary, it is needless to say that the initial calibration is unnecessary. Steps S103 and S104

The projection apparatus 102 projects the first pattern light, indicating the first pattern projection image including the first pattern image and second pattern image, on the subject for a period of 2 frames or longer. In other words, the projection apparatus 102 projects pattern light on the subject following a projection sequence with image projection corresponding to basic patterns and auxiliary patterns coexisting. At this time, the projection apparatus 102 projects pattern images of each of non-inverted bits and inverted bits.

The imaging apparatus 101 images the first pattern light. The calculator 104 acquires the first three-dimensional shape information from the imaged image based on the first pattern light.

Step S105

Thereafter, the calculator 104 updates the second three-dimensional shape information based on the first three-dimensional shape information. Accordingly, a moving object can be tracked based on relative amount of change.

Next, the measurement method of a moving object according to the present embodiment will be described while comparing with the conventional method. FIG. 6A illustrates a projection sequence in conventional three-dimensional measurement. The conventional projection sequence performs measurement while sequentially projecting projection light for bit 0 through bit 5 for X-coordinates. Two frames including the inverted pattern image are used in measurement of 1 bit, so in the example illustrated in FIG. 6A, measurement is performed in 10-frame cycles.

In a conventional projection sequence, the past 5 bits worth is tabulated and X coordinates are acquired, each time measurement results of a new bit are acquired. Thus, the distance to the subject 103 can be obtained by triangulation. However, this is dependent on images of the past 10 frames, so deterioration in time resolution is unavoidable. In the present embodiment, a specific bit in auxiliary code is used in addition to the gray code illustrated in FIG. 6A that is used in conventional measurement.

Referencing FIGS. 2A and 2B again, with particular notice given to the code columns of each bit in the gray code and auxiliary code illustrated respectively in FIGS. 2A and 2B, it can be seen that the cycle of repetitive patterns of 0s and 1s according to the bit position is the same between the gray code and auxiliary code, with the phase of repetitive patterns being shifted 90 degrees from each other. That is to say, the auxiliary code is obtained by shifting the phase of the gray code by 90 degrees for each bit.

The present embodiment assumes that the distance of object of measurement does not change one pixel worth or more in a section for measuring 3 bits, i.e., in 6 frame sections. Hereinafter, a measurement method of using bit 0 in auxiliary code corresponding to bit 0 in gray code.

FIG. 6B illustrates a projection sequence in the three-dimensional measurement according to the present embodiment. The imaging sequence according to the present embodiment has increment sequences determined by sections of measuring 3 bits. An increment sequence includes bit 0 of the gray code and bit 0 of the auxiliary code corresponding thereto. The increment sequence also includes bits other than bit 0 of the gray code. In the illustrated example, first, pattern light indicating an image corresponding to bit 0 of the gray code, bit 0 of the auxiliary code, and bit 1 of the gray code, is projected in this order. Next, pattern light indicating an image corresponding to bit 0 of gray code, bit 0 of auxiliary code, bit 2 of gray code, bit 0 of gray code, bit 0 of auxiliary code, bit 3 of gray code, bit 0 of gray code, bit 0 of auxiliary code, and bit 4 of gray code, is projected in this order. Accordingly, 24 frames are required for all bits to be included. Thereafter, such projection is repeatedly executed. Thus, auxiliary code is inserted between gray code in the projection sequence according to the present embodiment.

However, observing bit 0 in the gray code in FIG. 2A and bit 0 in the auxiliary code in FIG. 2B, it can be seen that as long as the change in distance to the subject is smaller than 1 pixel, relative change in the distance of the subject can be tracked by monitoring bit 0 in the gray code and auxiliary code. This measurement method is known as a technique for measuring relative movement amount by a rotary encoder or the like using gray code.

According to the present embodiment, the absolute value of distance to a subject first appearing in a frame is obtained with a delay of 24 frames. Thereafter, the relative value of change in distance can be obtained every 6 frames. Accordingly, the charge in distance to a subject regarding which the absolute value has been once captured can be tracked using 6 frames. Thus, high time resolution can be obtained as compared to conventional techniques.

While an example of using bit 0 of the auxiliary code has been illustrated in the present embodiment, the present disclosure is not restricted to this. Bit 1 or bit 2 or the like may be used for tracking relative amount of movement, in accordance with the amount of moment of the moving object to be measured. A specific bit of gray code may be made to be selectably decidable in accordance with the three-dimensional amount of change of the subject. For example, using bit 1 of the auxiliary code enables a moving object changing within a range of 3 pixels to be tracked, as illustrated in FIG. 2B. Also, using bit 2 of the auxiliary code enables a moving object changing within a range of 7 pixels to be tracked.

Also, mixing projection of auxiliary pattern images in the projection sequence while measuring the movement speed of the subject, i.e., whether or not to use auxiliary patterns, can be selectively switched in accordance to the three-dimensional amount of change of the subject. Further, the position of the bit in the auxiliary pattern that use used may be dynamically changed. Many systems can actually restrict their own speed. In the same way, the acceleration of the moving object by also be subject to restriction. Change in speed does not occur beyond a certain level, so the subject can be tracked within a certain range even if the bit in the auxiliary pattern is dynamically changed. Also, a greater number of pattern images can be superimposed in one frame period by changing the color or wavelength for each pattern image, instead of projecting pattern light indicating pattern images in increments of frames.

Hereinafter, description will be made primarily by way of a modification of the present embodiment. The measurement system 100 according to the present embodiment has one imaging apparatus 101. However, the measurement system 100 may be provided with multiple imaging apparatuses 101. The multiple imaging apparatuses 101 can image pattern light so as to compensate for each others' imaging range of the subject 103. Accordingly, occlusion regions where projection light is cast but imaging cannot be performed, can be reduced. Disposing at least two imaging apparatuses 101 on both sides of the projection apparatus 102 enables occlusion regions, where projection light is cast but imaging cannot be performed, to be reduced.

Although attention has been given to change in the distance direction (Z direction) between the projection apparatus 102 and the subject 103 in the present invention, it is needless to say that the subject 103 may change in the X-Y coordinate directions on the imaging plane, as well. The calculator 104 may, independently from three-dimensional shape measurement of the subject, search for the amount of two-dimensional movement, and decode an image indicating gray code imaged by the imaging apparatus 101, referencing the amount of two-dimensional movement.

Movement searching by two-dimensional image processing has been conventionally known as a method to track change in the X-Y coordinate directions. Obtaining motion vectors of the pixels by conventional movement searching, and decoding gray code based corresponding pixel positions in past frames, enables an even higher level of measurement to be obtained. In particular, the amount of movement of the subject can be restricted to within one pixel in high-speed vision space, so even if searching is performed in all directions, the range of the search is no larger than within a 3×3 range.

In a case where the frame rate becomes $\frac{1}{10}$, a range of 21×21 needs to be searched. This requires 49 times the amount of computations as compared to searching a 3×3 range ten times. Thus, there can be cases where the frame rate is increased and the amount of data is increased tenfold, but the amount of computations contrarily decreases to $\frac{1}{49}$. This is a feature of image processing with restrictions applied to high-speed vision space.

Now, a method will be proposed to obtaining an image to be handled in two-dimensional image processing, by compositing an imaged image of a non-inverted-bit pattern for projection, such as gray code or an auxiliary pattern or the like, and an imaged image of the inverted-bit pattern thereof. Using images of non-inverted-bit patterns and inverted-bit patterns is the technique described in Takei et al to improve robustness by Manchester coding. In Manchester coding, the frequency of occurrence of 0s and 1s in the temporal direction is equal at each bit. Accordingly, compositing multiple measurement images yields images equivalent to images obtained in a state where a constant amount of light is projected to all pixels. Thus, the composited image can be used for two-dimensional image processing such as movement searching and so forth, without having to perform new photography.

Further, a method of using other than inverted-bit pattern images will be proposed as an extension of coding. The four frames of an image corresponding to bit 0 in gray code, the inverted image thereof, an image corresponding to bit 0 in auxiliary pattern, and the inverted image thereof, are used in the above description. In the same way, measurement of a moving object can be realized using three frames, as well. In this method, the projection sequence further includes projection of a third image frame.

FIG. 7 illustrates the way a projection frame appears when acquiring 0 bit data of X-coordinates. In FIG. 7, the term first image frame means a frame of an image corresponding to bit 0 of the gray code in FIG. 2A. The term second image frame means a frame of an image corresponding to bit 0 of the auxiliary pattern in FIG. 2B. In the third image frame, at each pixel, the pixel value of the pixel corresponding to that pixel is 0 when the pixel value of the pixel is 1 within both the first and second image frames, and the pixel value of the pixel corresponding to that pixel is 1 when the pixel value of the pixel is 0 within both the first and second image frames. Note that in the third image frame, pixel values of pixels where the pixel values of both the first and second image frames differ can be handled as a don't-care value. These image frames may be projected in random order.

According to this method, if the movement of the object of measurement is sufficiently small in the three frame periods, each pixel will include 0 and 1, so a place where projection light is not being cast can be detected based on the imaging results. Determination of 0s and 1s can be made at places where projection light is being cast.

Further, in a case where, of the pixels in the third image frame, the pixel values of the pixels corresponding to that pixel differ between the first image frame and the second image frame, a value of 0 or 1 less frequently occurring in past frames of the third image frame may be allocated to the pixel within the third image frame.

Accordingly, the frequency of occurrence of 0s and 1s can be made uniform at each pixel, whereby applicability to the above-described two-dimensional image processing can be further improved. Also, flickering of patterns, which can occur in cases of using visible light to perform measurement, can be reduced. Further, shorter life span of the in the projection apparatus due to burn-in of the liquid crystal and deviation of the micro-mirror device can be prevented.

The projection apparatus 102 is used for measurement in the present disclosure, so the same projection apparatus 102 can be applied to fields such as projection mapping and so forth. Particularly, the measurement results can be converted into projection coordinates of the projection apparatus 102 since a correlation between the imaging coordinates of the projection apparatus 102 and the projection coordinates of the imaging apparatus 101 is obtained as a characteristic of measurement according to the present disclosure. This correlation being obtained means that various contents can be generated using this information, one example thereof being generating moiré topography images from that relationship. In this case, the content generating unit 480 within the calculator 104 generates moiré topography images as video content. Of course, conventional applications using distance information such as 3D computer graphics and so forth may be made as well. Note however, that conventional depth sensors that simply acquire distance information fundamentally cannot generate an exact moiré topography image, so this can be said to be a useful expression format that can be carried out by this method.

Moiré topography is a technology that uses slits at both the light projection and imaging to image contour lines of the subject. The correlation of imaging coordinates and projection coordinates has been obtained in the present embodiment, so moiré topography images can be obtained as a moving image by assuming slits for each and performing recalculation. Further, recording the original data for moiré topography images in memory or the like enables images with changed slit intervals to be obtained at a later time.

There are many users accustomed to seeing moiré topography images in the field of medicine, so being able to convert the image format is extremely meaningful. Further, applying projection mapping as described above enables an image indicating an affected part to be projected on the actual human body.

Second Embodiment

A vision chip according to a second embodiment of the present disclosure will be described with reference to FIGS. 8A through 8D. the vision chip according to the present embodiment can be used in the measurement system 100 according to the first embodiment.

Figure 8A:
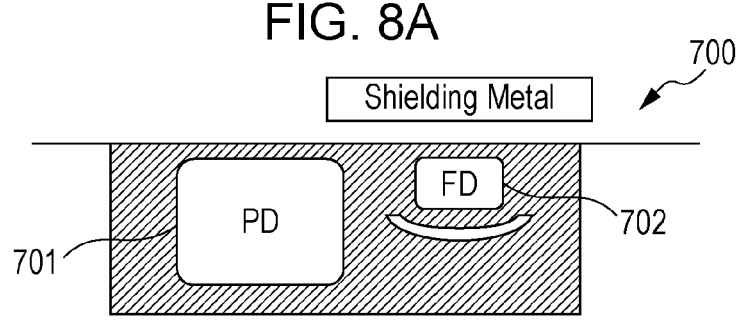
FIG. 8A is a schematic diagram illustrating the structure of unit pixels in a conventional complementary metal-oxide semiconductor (CMOS) image sensor.
Figure 8B:
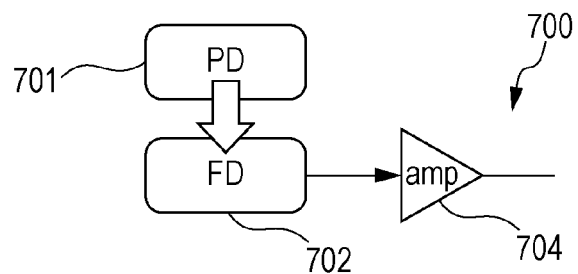
FIG. 8B is a conceptual diagram schematically illustrating data flow in the unit pixel in FIG. 8A.

FIG. 8A schematically illustrates the structure of a unit pixel 700 within a conventional CMOS image sensor having a global shutter function. FIG. 8B schematically illustrates the data flow within the unit pixel 700.

Light received by a photodiode 701 is converted into a charge. The charge is transmitted to a floating diffusion 702 at an appropriate timing. Thereafter, the potential is amplified by an amplifier 704 in accordance with the amount of charge. The light signal is then read out as multi-value information. The exposure time is controlled by the timing of resetting the charge at the photodiode 701 and floating diffusion 702, or by the timing of transfer.

Figure 8C:
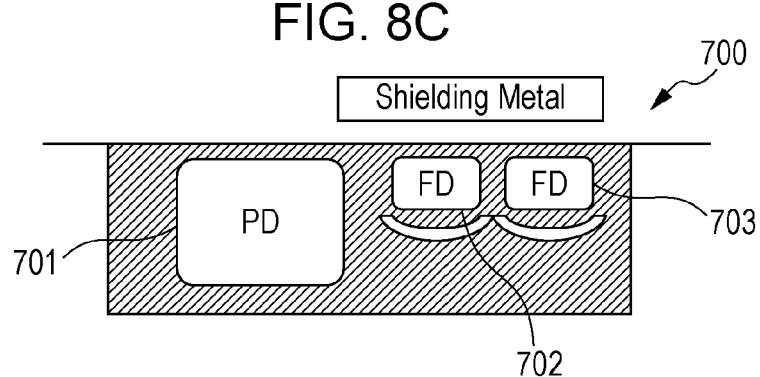
FIG. 8C is a schematic diagram illustrating the structure of unit pixels in a vision chip according to a second exemplary embodiment.
Figure 8D:
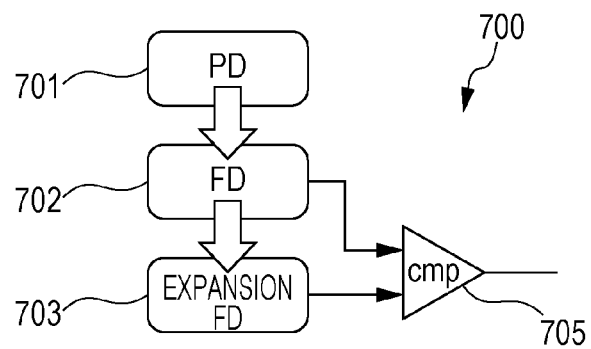
FIG. 8D is a conceptual diagram schematically illustrating data flow in the unit pixel in FIG. 8C.

FIG. 8C schematically illustrates the structure of a unit pixel 700 within the vision chip according to the present embodiment. FIG. 8D schematically illustrates the data flow within the unit pixel 700.

The vision chip according to the present embodiment has multiple unit pixels 700. Each of the multiple unit pixels 700 typically has a photodiode (PD) 701, a floating diffusion (FD) 702, an extended floating diffusion (EFD) 703, and a comparator 705.

The floating diffusion 702 and the extended floating diffusion 703 accumulate the charge generated by the photodiode 701. The comparator 705 finds the difference in potential generated in accordance with the charge accumulated in each of the floating diffusion 702 and the extended floating diffusion 703, and compares the relation in magnitude between the two.

Figure 9:
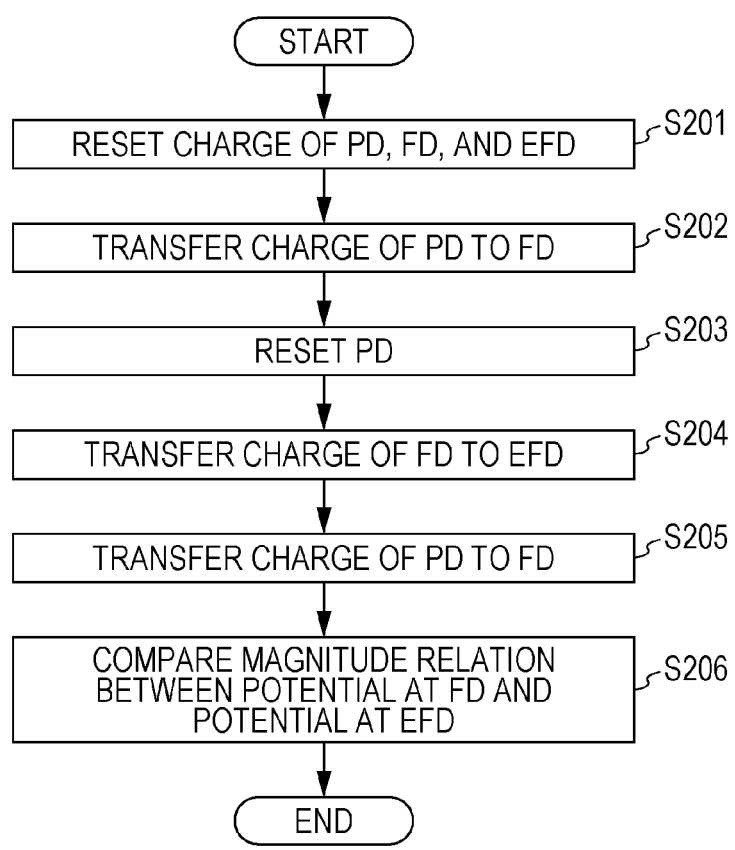
FIG. 9 is a sequence diagram illustrating the operations of the vision chip according to the second exemplary embodiment.

An operation sequence of the vision chip according to the present embodiment will be described with reference to FIG. 9. FIG. 9 illustrates an operation sequence of the vision chip according to the present embodiment.

Step S201

First, the charges of the photodiode 701, floating diffusion 702, and extended floating diffusion 703 are each reset at a first point-in-time.

Step S202

Next, at a second point-in-time, the charge of the photodiode 701 is transferred to the floating diffusion 702.

Step S203

The photodiode 701 is then reset at a third point-in-time.

Step S204

Next, the charge of the floating diffusion 702 is transferred to the extended floating diffusion 703 at a fourth point-in-time.

Step S205

Then at a fifth point-in-time, the charge of the photodiode 701 is transferred to the floating diffusion 702.

Step S206

Finally, the comparator 705 compares the potential corresponding to the charge of the floating diffusion 702 with the potential corresponding to the charge of the extended floating diffusion 703. As a result of the comparison, a first bit indicating the relation in magnitude between the two, and a second bit indicating whether or not the difference between the two is within a predetermined range, are output.

If a conventional image sensor is applied to the measurement system according to the first embodiment, the data band of the output of the image sensor will be a bottleneck, demanding more system resources. Also, in order to find the difference as to past frames, memory to store image data of past frames as it is in multi-value format needs to be provided externally to the image sensor. As a result, memory resources have to be increased in order to secure the memory capacity and bandwidth for accessing the memory.

According to the vision chip of the present embodiment, output is obtained in which the difference between a first frame exposed between the first point-in-time and the second point-in-time and a second frame exposed between the third point-in-time and the fifth point-in-time is coded. The output includes two bits for the two frames for each pixel. The vision chip internally holds past frame images as amount of charges, so there is no need to provide external memory, and memory capacity and bandwidth-related resources can be minimized.

According to the measurement system of the present disclosure, high-speed measurement of 3000 fps or higher can be realized in three-dimensional measurement of moving objects, and also the time resolution thereof can be maintained at a high level.

The following is a description of examples of assumed applications of the present disclosure. The present disclosure may be suitably applied to the field of machine vision such as factory automation (FA) device control, automobile headlight control, and so forth, interactive projection mapping, and so forth. Application to measurement fields of measuring quick human movements such as in sports or the like, and to the medical field, is conceivable. There are formats such as moiré topography in the field of medicine with which many are accustomed to using, and as described above, the imaging data according to the present disclosure can be converted into moiré topography format images.

The measurement system and measurement method according to the present disclosure is applicable to medical systems and projection mapping systems, for example.

What is claimed is:

1. A measurement system comprising:
    a projection apparatus that projects, onto a subject, first pattern light indicating a first pattern projection image including a first pattern image corresponding to a specific bit in gray code obtained by gray-coding projection coordinates included in a projection coordinate system, and a second pattern image having a same cycle as the first pattern image, but having a different phase from the first pattern image, following a projection sequence where projections of the first and second pattern images coexist; and at least one imaging apparatus that images the first pattern light and generates an imaged image, wherein the first pattern image includes a plurality of first columns of pixels in an x-axis direction of the first pattern image, wherein the second pattern image includes a plurality of second columns of pixels in the x-axis direction of the second pattern image, wherein when the subject is stationary, the first pattern image including the plurality of first columns of pixels and the second pattern image including the plurality of second columns of pixels are projected on a same portion on the subject, wherein in the first pattern image,
- a (j+1)th first column of pixels to a (j+k)th first column of pixels are dark,
- a (j+1+k)th first column of pixels to a (j+2k)th first column of pixels are light,
- a (j+1+2k)th first column of pixels to a (j+3k)th first column of pixels are dark, and
- (j+1+3k)th first column of pixels to a (j+4k)th first column of pixels are light, where j is a whole number equal to or greater than zero, and k is whole number greater than zero, and wherein in the second pattern image,
- a (j+1+p)th second column of pixels to a (j+k+p)th second column of pixels are dark,
- a (j+1+k+p)th second column of pixels to a (j+2k+p)th second column of pixels are light,
- a (j+1+2k+p)th second column of pixels to a (j+3k+p)th second column of pixels are dark, and
- (j+1+3k+p)th second column of pixels to a (j+4k+p)th second column of pixels are light, where p is not equal to zero and is not equal to an integral multiple of k.

2. The measurement system according to claim 1, further comprising:
a calculator that measures three-dimensional shape information of the subject based on the imaged image.

3. The measurement system according to claim 2,
wherein the projection apparatus projects, upon the subject, second pattern light indicating a second pattern projection image including the first pattern image and not including the second pattern image, for one frame period or more, and thereafter projects the first pattern light on the subject for two frame periods or more, and
wherein the calculator measures second three-dimensional shape information indicating an absolute distance to the subject, based on the imaged image of the second pattern light projected on the subject that has been imaged by the imaging apparatus, measures first three-dimensional shape information indicating a relative amount of change of the subject based on the imaged image of the first pattern light projected on the subject that has been imaged by the imaging apparatus, and updates the second three-dimensional shape information based on the first three-dimensional shape information.

4. The measurement system according to claim 3,
wherein the first pattern projection image further includes a third pattern image that is different from the first pattern image and the second pattern image,
wherein the projection sequence further includes projection of the third pattern image, wherein when a first pixel value of a first pixel included in the first pattern image is 1 and a second pixel value of a second pixel included in the second pattern image is 1, a third pixel value of a third pixel included in the third pattern image is 0,
wherein when a fourth pixel value of a fourth pixel included in the first pattern image is 0 and a fifth pixel value of a fifth pixel included in the second pattern image is 0, a sixth pixel value of a sixth pixel included in the third pattern image is 1,
wherein projection coordinates corresponding to the first pixel, projection coordinates corresponding to the second pixel, and projection coordinates corresponding to the third pixel are associated, and
wherein projection coordinates corresponding to the fourth pixel, projection coordinates corresponding to the fifth pixel, and projection coordinates corresponding to the sixth pixel are associated.

5. The measurement system according to claim 4,
wherein when a seventh pixel value of a seventh pixel included in the first pattern image is different from an eighth pixel value of an eighth pixel included in the second pattern image, a ninth pixel value of a ninth pixel included in the third pattern image is a value of 0 or 1 less frequently occurring in past frames of the third pattern image, and
wherein projection coordinates corresponding to the seventh pixel, projection coordinates corresponding to the eighth pixel, and projection coordinates corresponding to the ninth pixel are associated.

6. The measurement system according to claim 2,
wherein the calculator selectively switches mixing of projection of the second pattern image in the projection sequence, in accordance with a three-dimensional amount of change of the subject.

7. The measurement system according to claim 2,
wherein the calculator selectively decides the specific bit in gray code in accordance with a three-dimensional amount of change of the subject.

8. The measurement system according to claim 2,
wherein the calculator, independently from measurement of the three-dimensional shape of the subject, searches for an amount of two-dimensional movement, and decodes an image indicating the gray code imaged by the at least one imaging apparatus, referencing a two-dimensional amount of movement.

9. The measurement system according to claim 8,
wherein the image used for searching for the two-dimensional amount of movement is obtained by compositing a plurality of images acquired by the three-dimensional shape measurement.

10. The measurement system according to claim 2,
wherein the calculator decodes the imaged image and obtains the three-dimensional shape information, the three-dimensional shape information being stipulated under an imaging coordinate system for imaged images by the at least one imaging apparatus, and
wherein the calculator converts the three-dimensional shape information stipulated under the imaging coordinate system into three-dimensional shape information stipulated under the projection coordinate system, based on a correlation between projection coordinates included in the projection coordinate system and imaging pixel coordinates included in the imaging coordinate system.

11. The measurement system according to claim 2,
wherein the calculator decodes the imaged image, and generates a moiré topography image based on a correlation between projection coordinates included in the projection coordinate system and imaging pixel coordinates included in the imaging coordinate system for the at least one imaging apparatus.

12. The measurement system according to claim 2,
wherein the calculator generates a projection image based on the three-dimensional shape information,
and wherein the projection apparatus projects projection light indicating the projection image on the subject.

13. The measurement system according to claim 1,
wherein the at least one imaging apparatus is a plurality of imaging apparatuses, and
wherein the plurality of imaging apparatuses image resulting light from the subject when the first pattern light is projected on the subject to complement imaging ranges of the plurality of imaging apparatuses.

14. A vision chip used in the measurement system according to claim 1, including a plurality of unit pixels,
wherein each of the plurality of unit pixels includes
a photoreceptor that receives light and generates charge,
first and second charge accumulators that respectively accumulate a first and second charge obtained by the photoreceptor at different points-in-time, and
a comparator that compares an amount of the first charge accumulated in the first charge accumulator with an amount of the second charge accumulated in the second charge accumulator, and generates a first bit indicating the relation in magnitude between the first and second amounts of charge, and a second bit indicating whether or not the difference between the first and second amounts of charge is within a predetermined range, based on the comparison results.

15. A measurement method used in a measurement system including a projection apparatus and an imaging apparatus, the method comprising:
projecting, using the projecting apparatus, onto a subject to be measured, second pattern light indicating a first pattern projection image including a first pattern image corresponding to a specific bit in gray code obtained by gray-coding projection coordinates included in a projection coordinate system, and not including a second pattern projection image having a same cycle as the first pattern image, but having a different phase from the first pattern image, for one frame period or more, and thereafter projecting first pattern light indicating a first pattern projection image including the first and second pattern images on the subject for two frame periods or more;
measuring second three-dimensional shape information indicating absolute distance to the subject, based on the imaged image of the second pattern light projected on the subject that has been imaged by the imaging apparatus;
measuring first three-dimensional shape information indicating relative amount of change of the subject based on the imaged image of the first pattern light projected on the subject that has been imaged by the imaging apparatus; and
updating the second three-dimensional shape information based on the first three-dimensional shape information,
wherein the first pattern image includes a plurality of first columns of pixels in an x-axis direction of the first pattern image,
wherein the second pattern image includes a plurality of second columns of pixels in the x-axis direction of the second pattern image,
wherein when the subject is stationary, the first pattern image including the plurality of first columns of pixels and the second pattern image including the plurality of second columns of pixels are projected on a same portion on the subject,
wherein in the first pattern image,
a (j+1)th first column of pixels to a (j+k)th first column of pixels are dark,
a (j+1+k)th first column of pixels to a (j+2k)th first column of pixels are light,
a (j+1+2k)th first column of pixels to a (j+3k)th first column of pixels are dark, and
(j+1+3k)th first column of pixels to a (j+4k)th first column of pixels are light,
where j is a whole number equal to or greater than zero, and k is whole number greater than zero, and
wherein in the second pattern image,
a (j+1+p)th second column of pixels to a (j+k+p)th second column of pixels are dark,
a (j+1+k+p)th second column of pixels to a (j+2k+p)th second column of pixels are light,
a (j+1+2k+p)th second column of pixels to a (j+3k+p)th second column of pixels are dark, and
(j+1+3k+p)th second column of pixels to a (j+4k+p)th second column of pixels are light, where p is not equal to zero and is not equal to an integral multiple of k.

* * * * *